United States Patent
Clark et al.

(10) Patent No.: US 10,619,737 B2
(45) Date of Patent: Apr. 14, 2020

(54) PARK PAWL ENGAGEMENT AND SENSOR ASSEMBLY AND METHOD

(71) Applicants: David A. Clark, Madison, AL (US); Mengying Luo, Huntsville, AL (US)

(72) Inventors: David A. Clark, Madison, AL (US); Mengying Luo, Huntsville, AL (US)

(73) Assignee: Electricfil Corporation, Elkmont, AL (US)

( * ) Notice: Subject to any disclaimer, the term of this patent is extended or adjusted under 35 U.S.C. 154(b) by 322 days.

(21) Appl. No.: 15/674,670

(22) Filed: Aug. 11, 2017

(65) Prior Publication Data

US 2019/0049005 A1 Feb. 14, 2019

(51) Int. Cl.
| | | |
|---|---|---|
| *F16H 63/34* | (2006.01) | |
| *G01D 5/20* | (2006.01) | |
| *B60T 1/00* | (2006.01) | |
| *F16H 63/48* | (2006.01) | |
| *G01D 5/14* | (2006.01) | |

(52) U.S. Cl.
CPC .......... *F16H 63/3425* (2013.01); *B60T 1/005* (2013.01); *F16H 63/48* (2013.01); *G01D 5/20* (2013.01); *F16H 63/3433* (2013.01); *G01D 5/145* (2013.01)

(58) Field of Classification Search
CPC .. F16H 63/34; F16H 63/3416; F16H 63/3425; F16H 63/3433; F16H 63/3458; F16H 63/3466; F16H 63/48; F16H 63/483; B60T 1/005; B60T 1/062
See application file for complete search history.

(56) References Cited

U.S. PATENT DOCUMENTS

| | | | |
|---|---|---|---|
| 2002/0092720 A1* | 7/2002 | Schafer | B60T 1/005 188/158 |
| 2007/0283735 A1* | 12/2007 | Schweiher | F16H 63/3433 70/245 |
| 2008/0051252 A1* | 2/2008 | Nishimura | B60T 1/005 477/92 |
| 2014/0060228 A1* | 3/2014 | Galea | F16H 63/34 74/473.22 |
| 2014/0232039 A1* | 8/2014 | Minematsu | F16H 59/70 264/272.19 |

(Continued)

*Primary Examiner* — Jacob S. Scott
*Assistant Examiner* — Lori Wu
(74) *Attorney, Agent, or Firm* — Clements Bernard Walker; Richard A. Walker; Christopher L. Bernard (57) ABSTRACT

A park pawl assembly for use in a vehicle with an automatic transmission, including: a park pawl member comprising a raised tooth structure disposed at an end thereof, wherein the raised tooth structure is configured to selectively engage a corresponding recessed structure of an output gear, thereby selectively preventing rotation of the output gear; a linkage physically contacting the end of the park pawl member and configured to selectively bias the raised tooth structure of the park pawl member into the recessed structure of the output gear; a control arm physically coupled to the linkage and configured to selectively actuate the linkage; a first sensor component coupled to and configured to sense actuation of one or more of the linkage and the control arm; and a second sensor component coupled to and configured to sense actuation of the park pawl member.

20 Claims, 9 Drawing Sheets

(56) References Cited

U.S. PATENT DOCUMENTS

2015/0025750 A1\* 1/2015 Weslati ................. B60W 10/11
　　　　　　　　　　　　　　　　　　　　　　　701/48
2015/0252897 A1\* 9/2015 Kristofcsak ............. F16H 63/18
　　　　　　　　　　　　　　　　　　　　　　　192/219.5
2015/0267811 A1\* 9/2015 Kristofcsak ......... F16H 63/3433
　　　　　　　　　　　　　　　　　　　　　　　192/219.5

\* cited by examiner

PARK PAWL ENGAGEMENT AND SENSOR ASSEMBLY AND METHOD

FIELD OF THE INVENTION

The present invention relates generally to the automotive field. More specifically, the present invention relates to a park pawl engagement and sensor assembly and method for preventing an automobile with an automatic transmission from moving when set to "park."

BACKGROUND OF THE INVENTION

Pursuant to Federal Motor Vehicle Safety Standard (FMVSS) 114, all automobiles with automatic transmissions must incorporate a mechanism for preventing the automobile from moving when set to "park." Similar standards apply to other types of vehicles. The most common solution utilized in North America is a park pawl mechanism. A park pawl is a thick metal component having a single tooth feature. When an automobile is set to "park," the park pawl tilts and the single tooth feature is locked into a corresponding gear, typically referred to as the output gear or pawl gear, thereby preventing the automobile from moving.

Such park pawl mechanisms are, unfortunately, prone to error. Most park pawls utilize a spring-loaded piston that applies pressure to the park pawl when the automobile is set to "park." Monitoring is performed upstream of the spring, thereby monitoring only actuation of the park pawl linkage, and not actual engagement of the park pawl with the output gear. If actual engagement of the park pawl is monitored, it is done by sensing the rotation of the output gear itself—after the park pawl has already failed and potentially dangerous automobile motion has already occurred. This is usually accomplished by monitoring the mechanical linkages associated with the park pawl or using speed sensors. The safety of the automobile is therefore compromised.

Thus, what is still needed in the art is an improved park pawl mechanism that ensures both the actuation of the park pawl linkage and actual engagement of the park pawl with the output gear, thereby enhancing the safety of the automobile.

BRIEF SUMMARY OF THE INVENTION

In various exemplary embodiments, the present invention provides a park pawl engagement and sensor assembly that ensures both the actuation of the park pawl linkage and actual engagement of the park pawl with the output gear, other than by sensing the rotation of the output gear itself. This is accomplished using two sensors—one that monitors the actuation of the park pawl linkage and one that monitors the engagement of the park pawl with the output gear. This design is simpler than conventional designs and is very compact, consisting of one assembly instead of multiple components installed separately.

In one exemplary embodiment, the present invention provides a park pawl engagement and sensor assembly for use in a vehicle with an automatic transmission, comprising: a park pawl member comprising a raised tooth structure disposed at an end thereof, wherein the raised tooth structure is configured to selectively engage a corresponding recessed structure of an output gear, thereby selectively preventing rotation of the output gear and preventing movement of the vehicle; a linkage physically contacting the end of the park pawl member and configured to selectively bias the raised tooth structure of the park pawl member into the recessed structure of the output gear; a control arm physically coupled to the linkage and configured to selectively actuate the linkage; a first sensor component coupled to one or more of the linkage and the control arm and configured to sense actuation of the one or more of the linkage and the control arm; and a second sensor component coupled to the park pawl member and configured to sense actuation of the park pawl member. Optionally, the park pawl assembly further comprises a third sensor component coupled to the output gear and configured to sense rotation of the output gear. It should be noted that the linkage and the control arm may be replaced with a comparable single or multi-component actuator that is coupled to and otherwise operates to actuate the park pawl.

In another exemplary embodiment, the present invention provides a park pawl engagement and sensor assembly for use in a vehicle with an automatic transmission, comprising: an elongate park pawl member comprising a raised tooth structure disposed at a proximal end thereof and pivotable about a pivot point disposed at a distal end thereof, wherein the raised tooth structure is configured to selectively engage a corresponding recessed structure of an output gear, thereby selectively preventing rotation of the output gear and preventing movement of the vehicle; a linkage physically contacting the proximal end of the park pawl member and configured to selectively bias the raised tooth structure of the park pawl member into the recessed structure of the output gear; a control arm physically coupled to the linkage and configured to selectively actuate the linkage; a first sensor coupled to one or more of the linkage and the control arm and configured to sense actuation of the one or more of the linkage and the control arm; and a second sensor coupled to the park pawl member and configured to sense actuation of the park pawl member. The linkage is translated into the park pawl member to selectively bias the raised tooth structure of the park pawl member into the recessed structure of the output gear. A proximal end of the linkage comprises a spring member configured to provide a resistive force between the park pawl member and the linkage. The control arm is pivoted to selectively actuate the linkage. Optionally, the park pawl member and the control arm are pivoted about a common axis. The first sensor is magnetically or electromagnetically coupled to one or more of the linkage and the control arm via a first magnet or metallic portion associated with the one or more of the linkage and the control arm. The second sensor is magnetically or electromagnetically coupled to the park pawl member via a second magnet or metallic portion associated with the park pawl member. These sensors may also be inductive eddy current sensors or the like and may share certain common components. Optionally, the first sensor and the second sensor are disposed in a common housing. Optionally, the park pawl assembly further comprises a third sensor coupled to the output gear and configured to sense rotation of the output gear.

In a further exemplary embodiment, the present invention provides a park pawl engagement and sensor method for use in a vehicle with an automatic transmission, comprising: providing an elongate park pawl member comprising a raised tooth structure disposed at a proximal end thereof and pivotable about a pivot point disposed at a distal end thereof, wherein the raised tooth structure is configured to selectively engage a corresponding recessed structure of an output gear, thereby selectively preventing rotation of the output gear and preventing movement of the vehicle; providing a linkage physically contacting the proximal end of the park pawl member and configured to selectively bias the raised tooth structure of the park pawl member into the recessed structure of the output gear; providing a control arm physically coupled to the linkage and configured to selectively actuate the linkage; providing a first sensor coupled to one or more of the linkage and the control arm and configured to sense actuation of the one or more of the linkage and the control arm; and providing a second sensor coupled to the park pawl member and configured to sense actuation of the park pawl member. The linkage is translated into the park pawl member to selectively bias the raised tooth structure of the park pawl member into the recessed structure of the output gear. A proximal end of the linkage comprises a spring member configured to provide a resistive force between the park pawl member and the linkage. The control arm is pivoted to selectively actuate the linkage. Optionally, the park pawl member and the control arm are pivoted about a common axis. The first sensor is magnetically or electromagnetically coupled to one or more of the linkage and the control arm via a first magnet or metallic portion associated with the one or more of the linkage and the control arm. The second sensor is magnetically or electromagnetically coupled to the park pawl member via a second magnet or metallic portion associated with the park pawl member. These sensors may also be inductive eddy current sensors or the like and may share certain common components. Optionally, the first sensor and the second sensor are disposed in a common housing. Optionally, the first sensor and the second sensor are disposed in a common housing. Optionally, the park pawl method further comprises providing a third sensor coupled to the output gear and configured to sense rotation of the output gear.

BRIEF DESCRIPTION OF THE DRAWINGS

The present invention is illustrated and described herein with reference to the various drawings, in which like reference numbers are used to denote like assembly components/method steps, as appropriate, and in which.

DETAILED DESCRIPTION OF THE INVENTION

Figure 1:
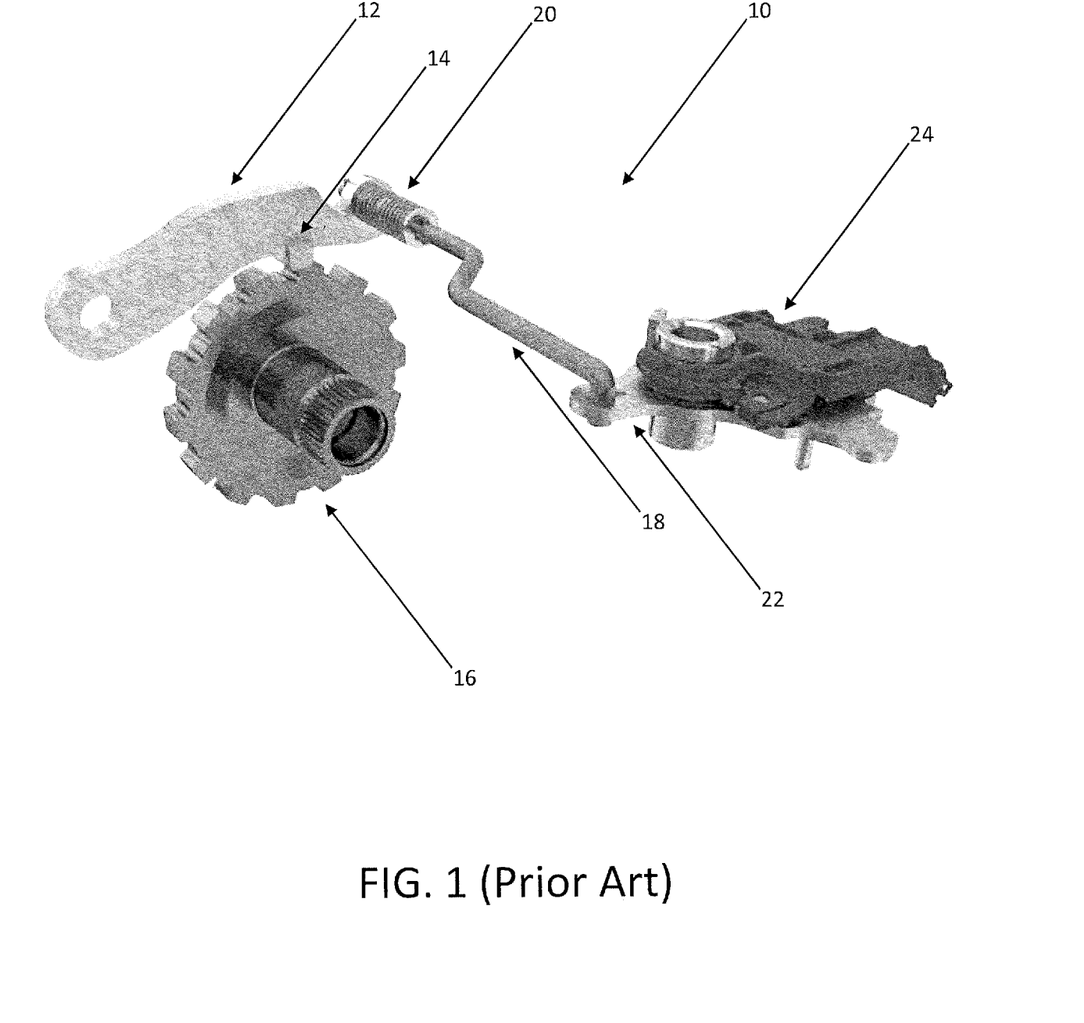
FIG. 1 is a perspective view of a conventional park pawl mechanism.

Referring now specifically to FIG. 1, a conventional park pawl mechanism 10 includes an elongate, pivotable park pawl 12 comprising a raised tooth structure 14 or the like that selectively engages an associated rotatable, toothed output gear 16, thereby selectively preventing rotation of the output gear 16 and, correspondingly, movement of the associated automobile or other vehicle. It should be noted that all components are manufactured from substantially rigid materials, such as metallic materials. The park pawl 12 is pivotably actuated to engage and lock the output gear 16 by a rotating and/or translating linkage 18 that selectively depresses a free end of the park pawl 12 into the output gear 16. A proximal end of the linkage 18 includes a spring-loaded engagement mechanism 20 that physically couples the linkage 18 to the park pawl 12, providing a resistive coupling force between the linkage 18 and the park pawl 12. In this conventional embodiment, the linkage 18, and thus the park pawl 12, are actuated by rotation of a control arm 22 coupled to a distal end of the linkage 18 that is deployed when the automobile is set to "park." A sensor package 24 is provided that monitors the rotation of the control arm 24, movement of the linkage 18, and/or deployment of the spring-loaded engagement mechanism 20, thereby indicating the intended engagement of the park pawl 12 with the output gear 16. Optionally, a sensor package is also provided that monitors the rotation of the output gear 16 itself, disadvantageously only after the park pawl 12 has already failed and potentially dangerous automobile motion has already occurred.

As indicated above, the present invention provides a park pawl engagement and sensor assembly that ensures both the actuation of the park pawl linkage and actual engagement of the park pawl with the output gear, other than by sensing the rotation of the output gear itself. This is accomplished using two sensors—one that monitors the actuation of the park pawl linkage and one that monitors the engagement of the park pawl with the output gear. This design is simpler than conventional designs and is very compact, consisting of one assembly instead of multiple components installed separately.

Figure 2:
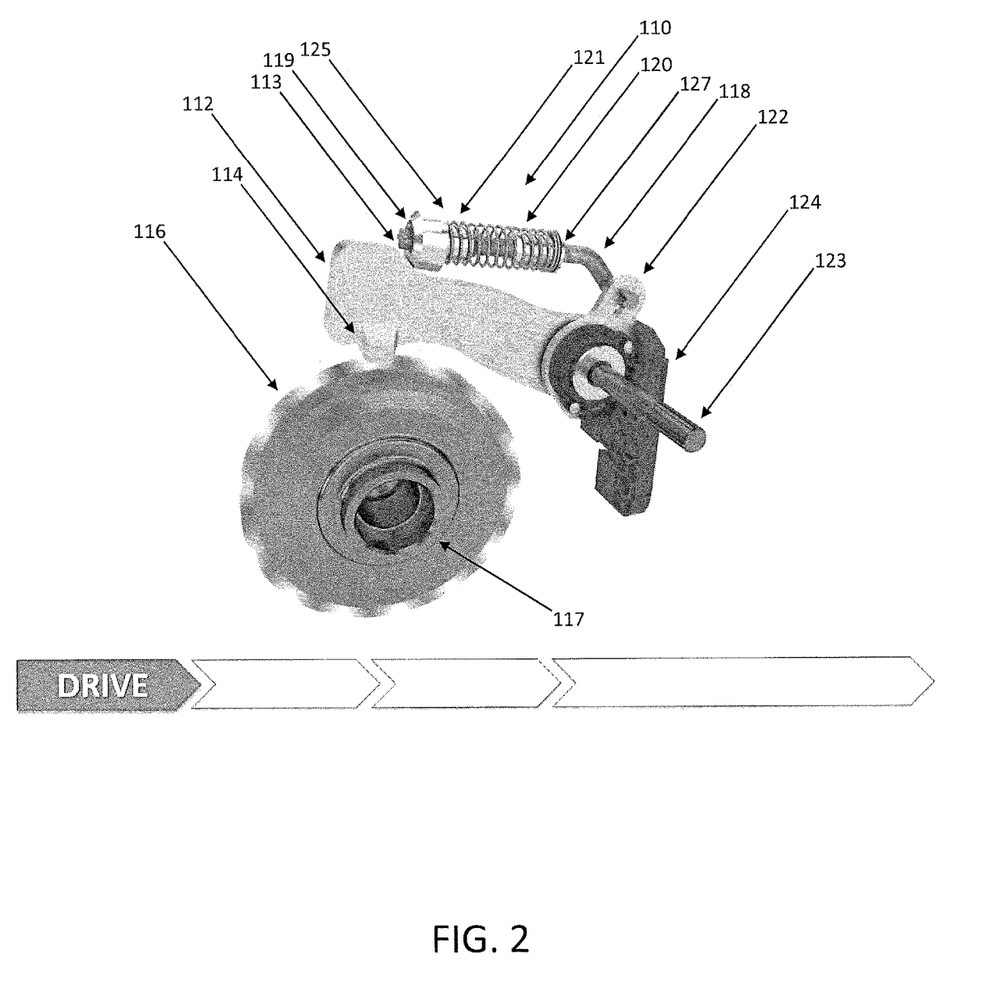
FIG. 2 is a perspective view of one exemplary embodiment of the park pawl engagement and sensor assembly of the present invention, with the output gear spinning in a drive configuration.

Referring now specifically to FIG. 2, in one exemplary embodiment of the present invention, the park pawl assembly 110 includes an elongate, pivotable park pawl 112 comprising a raised tooth structure 114 or the like that selectively engages an associated rotatable, toothed output gear 116 or the like, thereby selectively preventing rotation of the output gear 116 about its axle 117 and, correspondingly, movement of the associated automobile or other vehicle. It should again be noted that all components are manufactured from substantially rigid materials, such as metallic materials. In general, the park pawl 112 has an overall length of between about 100 mm and about 180 mm, an overall with of between about 40 mm and about 70 mm, and an overall thickness of between about 5 mm and about 15 mm. The park pawl 112 may be a substantially rectangular structure, a substantially curvilinear structure, or an irregular shaped structure, as appropriate in a given application. It should be noted that, in FIG. 2, the output gear 116 is shown in a rotating "drive" configuration with the park pawl 112 disengaged, such that the raised structure 114 of the park pawl 112 does not engage any recessed structures of the output gear 116. The park pawl 112 is pivotably actuated to engage and lock the output gear 116 (when stopped in "park") by a rotating and/or translating linkage 118 that selectively depresses a free end of the park pawl 112 into the output gear 116. A proximal end of the linkage 118 includes a spring-loaded engagement mechanism 120 that physically couples the linkage 118 to the park pawl 112, providing a resistive coupling force between the linkage 118 and the park pawl 112. In this exemplary embodiment, the spring-loaded engagement mechanism 120 includes a tapered collar 119 or the like that physically contacts a lip structure 113 or the like manufactured into the park pawl 112. In this respect, the spring 120 and the proximal end of the linkage 118 form a shock-like structure, with the spring 120 being disposed around a bore 121 of the collar 119 and limited by a shoulder 125 of the collar 119. An opposite end of the spring 120 is limited by an appropriate stop structure 127. In this manner, the collar 119 may translate along the proximal end of the linkage 118 under the force exerted by the lip structure 113 of the park pawl 112 and resisted by the spring 120. It will be readily apparent to those of ordinary skill in the art that other suitable coupling mechanisms may also be used. The linkage 118, and thus the park pawl 112, are actuated by rotation of a control arm 122 pivotably coupled to a distal end of the linkage 118 that is deployed when the automobile is set to "park." In this exemplary embodiment, the control arm 122 and the park pawl 112 rotate or pivot about a common axis 123. Again, it will be readily apparent to those of ordinary skill in the art that other suitable configurations may also be used. As described in greater detail herein below, a sensor package 124 is provided that monitors the rotation of the control arm 122, movement of the linkage 118, and/or deployment of the spring-loaded engagement mechanism 120, thereby indicating the intended engagement of the park pawl 112 with the output gear 116. The same sensor package 124 also monitors the rotation/deployment of the park pawl 112 itself. Thus, actual engagement of the park pawl 112 and the output gear 116 are monitored without unsafe delay. Further, it should be noted that the park pawl 112 and control arm 122 may be coupled to am electric motor (not illustrated) that selectively actuates one or both. Finally, it should be noted that the linkage 118 and the control arm 122 may be replaced with a comparable single or multi-component actuator that is coupled to and otherwise operates to actuate the park pawl 112.

Figure 3:
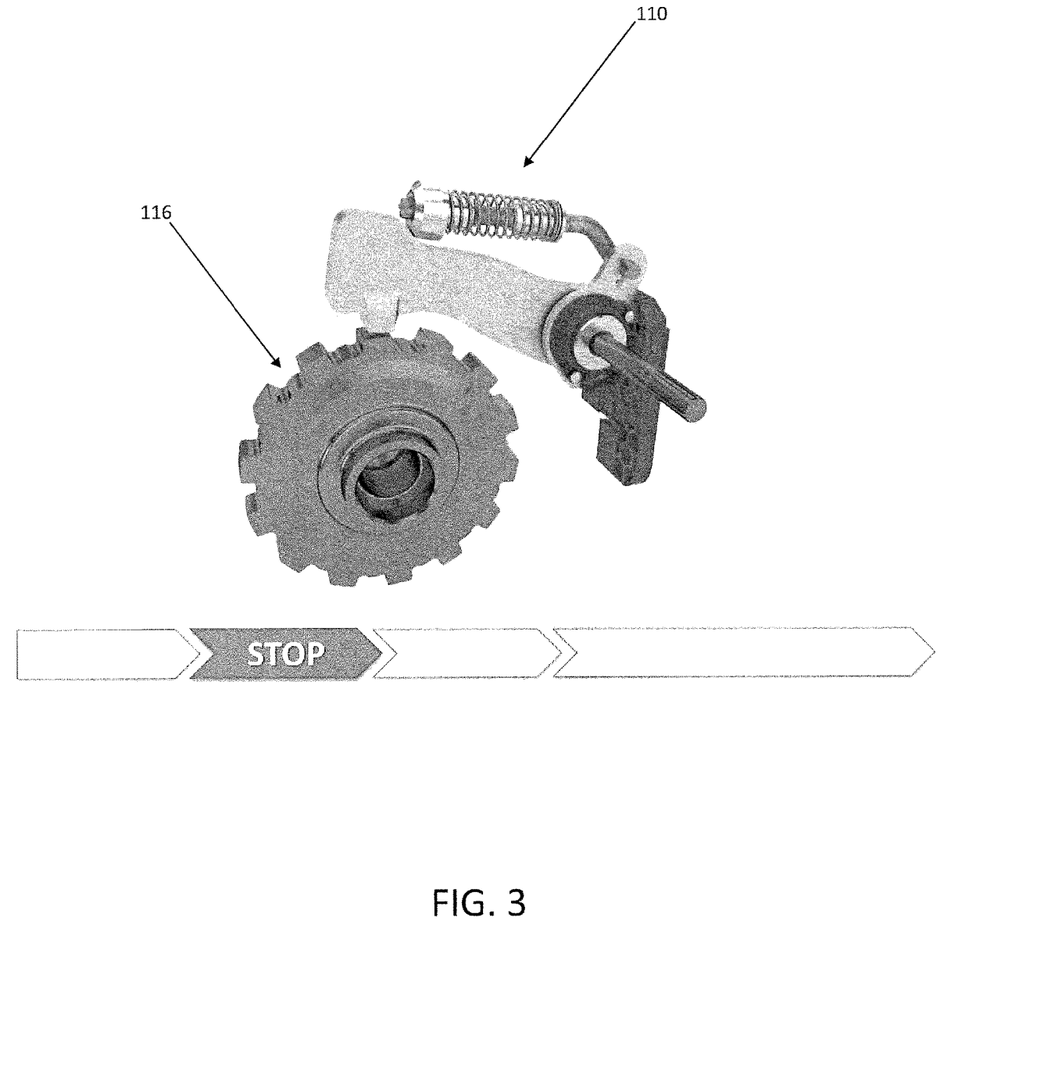
FIG. 3 is a perspective view of one exemplary embodiment of the park pawl engagement and sensor assembly of the present invention, with the output gear stationary in a stopped configuration.

FIG. 3 illustrates the park pawl assembly 110 with the output gear 116 stationary in a stopped configuration.

Figure 4:
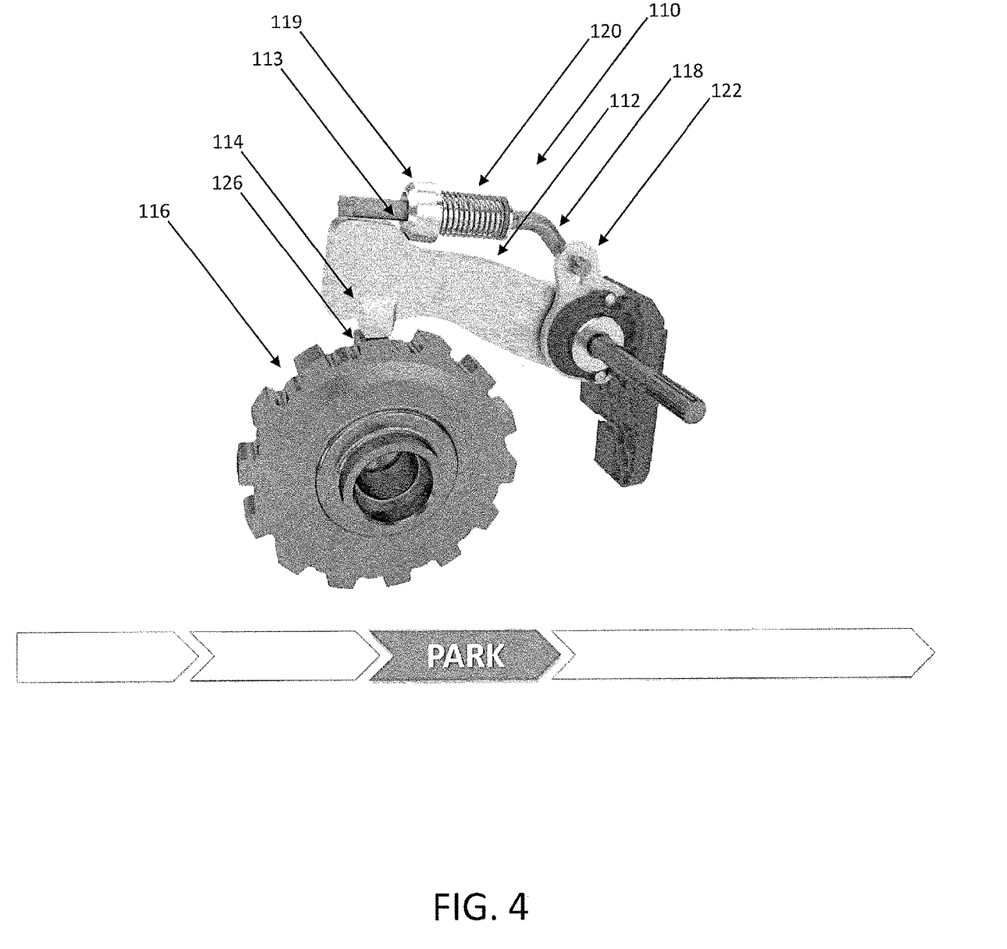
FIG. 4 is a perspective view of one exemplary embodiment of the park pawl engagement and sensor assembly of the present invention, with the output gear stationary in a parked configuration with the park pawl disengaged.

FIG. 4 illustrates the park pawl assembly 110 with the output gear 116 stationary in a parked configuration with the park pawl 112 disengaged. In this configuration, the automobile is set to "park," the control arm 122 is rotated towards the output gear 116, and the linkage 118 is translated towards the output gear 116 along the park pawl 112, thereby compressing the spring 120 and driving the tapered collar 119 into the ramped lip structure 113 of the park pawl and generating a force on the park pawl 112 directed towards the output gear 116. The tooth structure 114 of the park pawl 112 does not yet engage the output gear 116 because it abuts and is resisted by a tooth structure 126 of the output gear 116. Therefore, the output gear 116 is not yet locked by the park pawl 112.

Figure 5:
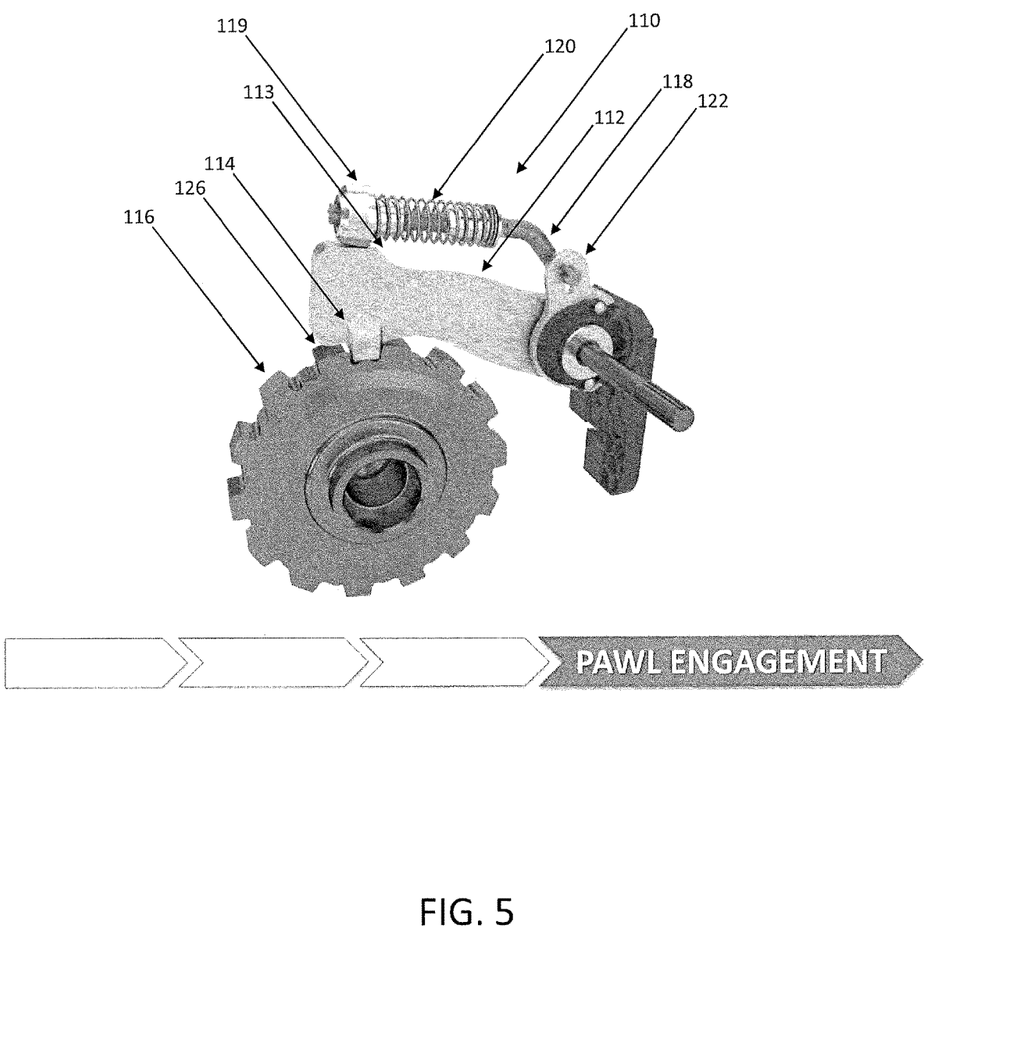
FIG. 5 is a perspective view of one exemplary embodiment of the park pawl engagement and sensor assembly of the present invention, with the output gear stationary in a parked configuration with the park pawl engaged.

FIG. 5 illustrates the park pawl assembly 110 with the output gear 116 stationary in a locked configuration with the park pawl 112 engaged. In this configuration, the automobile is set to "park," the control arm 122 is rotated towards the output gear 116, and the linkage 118 is translated towards the output gear 116 along the park pawl 112. The spring 120 is now expanded, driving the tapered collar 119 past the ramped lip structure 113 of the park pawl and generating a force on the park pawl 112 directed towards the output gear 116. The tooth structure 114 of the park pawl 112 engages the output gear 116 because it now sits adjacent to the tooth structure 126 of the output gear 116. Therefore, the output gear 116 is locked by the park pawl 112.

Figure 6:
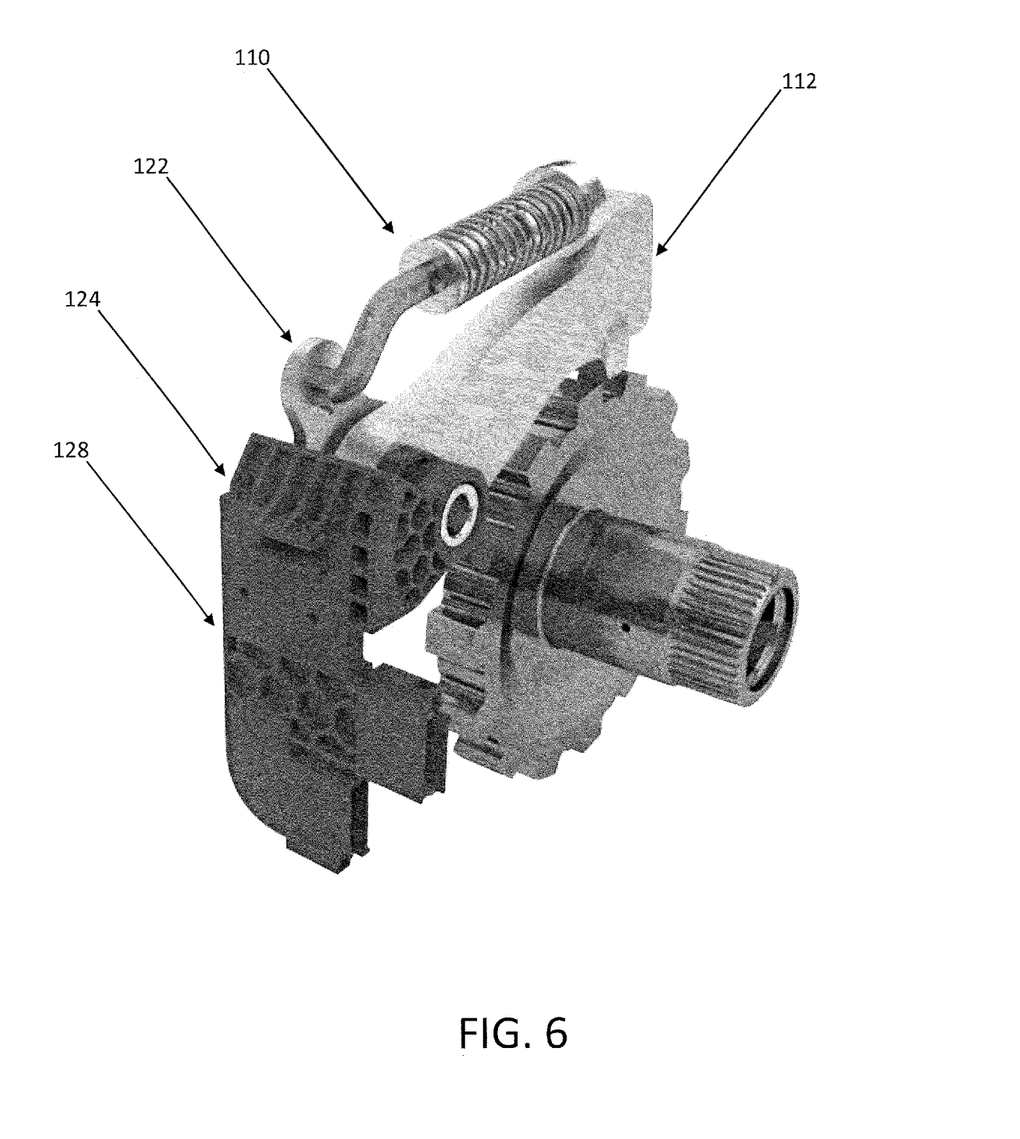
FIG. 6 is a perspective view of one exemplary embodiment of the park pawl engagement and sensor assembly of the present invention, highlighting the dual-sensor package.
Figure 7:
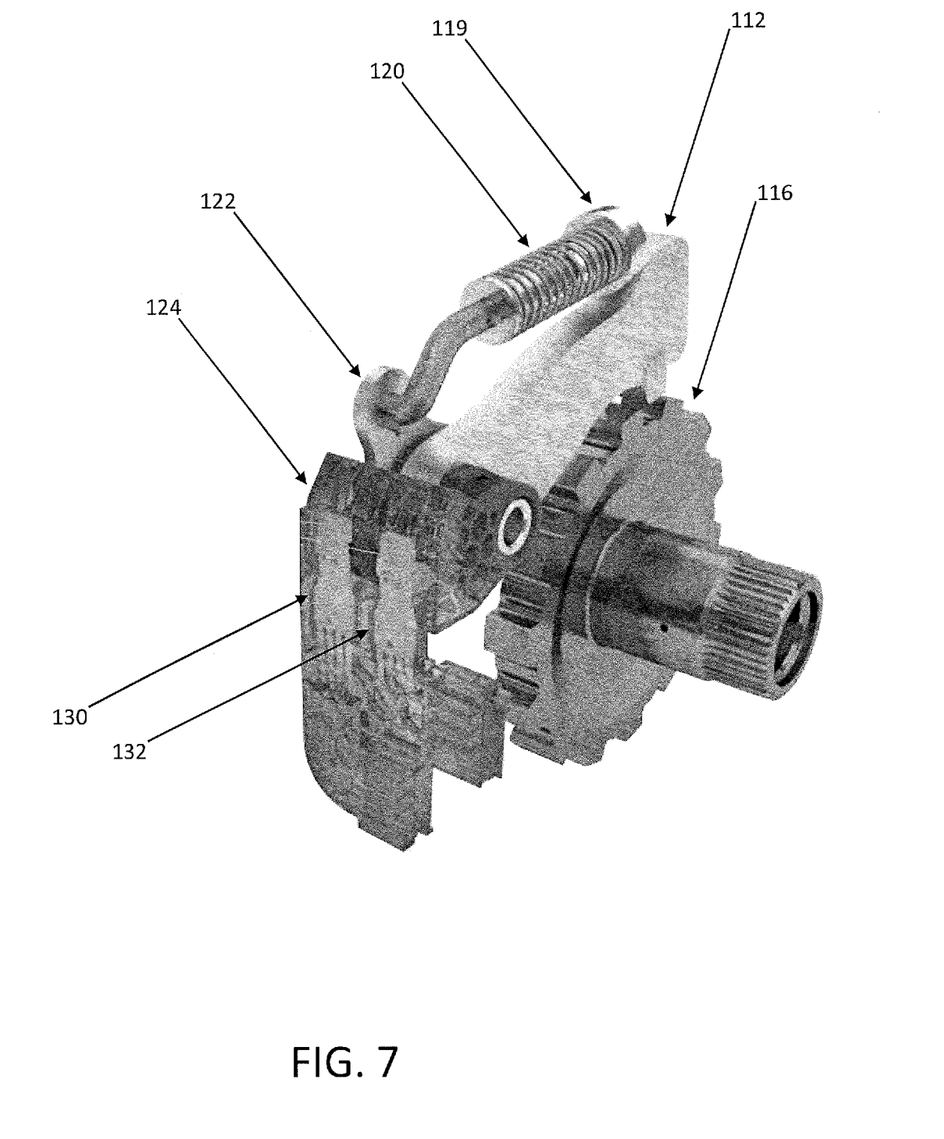
FIG. 7 is a partially transparent perspective view of one exemplary embodiment of the park pawl engagement and sensor assembly of the present invention, again highlighting the dual-sensor package.

Referring now specifically to FIGS. 6 and 7, in one exemplary embodiment of the present invention, the sensor package 124 includes a sensor housing 128/multiple sensor housings 128 that is/are coupled to the remainder of the park pawl assembly 110 in proximity to a proximal end of the park pawl 112 and the control arm 122. The sensor housing 128 may include any suitable attachment mechanisms for attachment to the remainder of the park pawl assembly 110 or any other adjacent structures. Functionally, at least two sensors 130 and 132 are disposed within the sensor housing 128. A control arm sensor 130 is designed to sense rotation/translation of the control arm 122, rotation/translation of the linkage 118, and/or deflection of the spring 120 and/or collar 119, thereby ensuring proper actuation of the park pawl 112. A park pawl sensor 132 is designed to sense rotation of the park pawl 112 directly, thereby ensuring proper engagement of the park pawl 112 with the output gear 116. Either or both of these sensors 130 and 132 may be Hall effect magnetic sensors that sense the movement of magnets coupled to or formed within the components monitored. Alternatively, either or both of these sensors 130 and 132 may be eddy current/inductive sensors that sense the movement of the components monitored themselves. A speed sensor may also be used to monitor the rotation of the output gear 116 itself.

Figure 8:
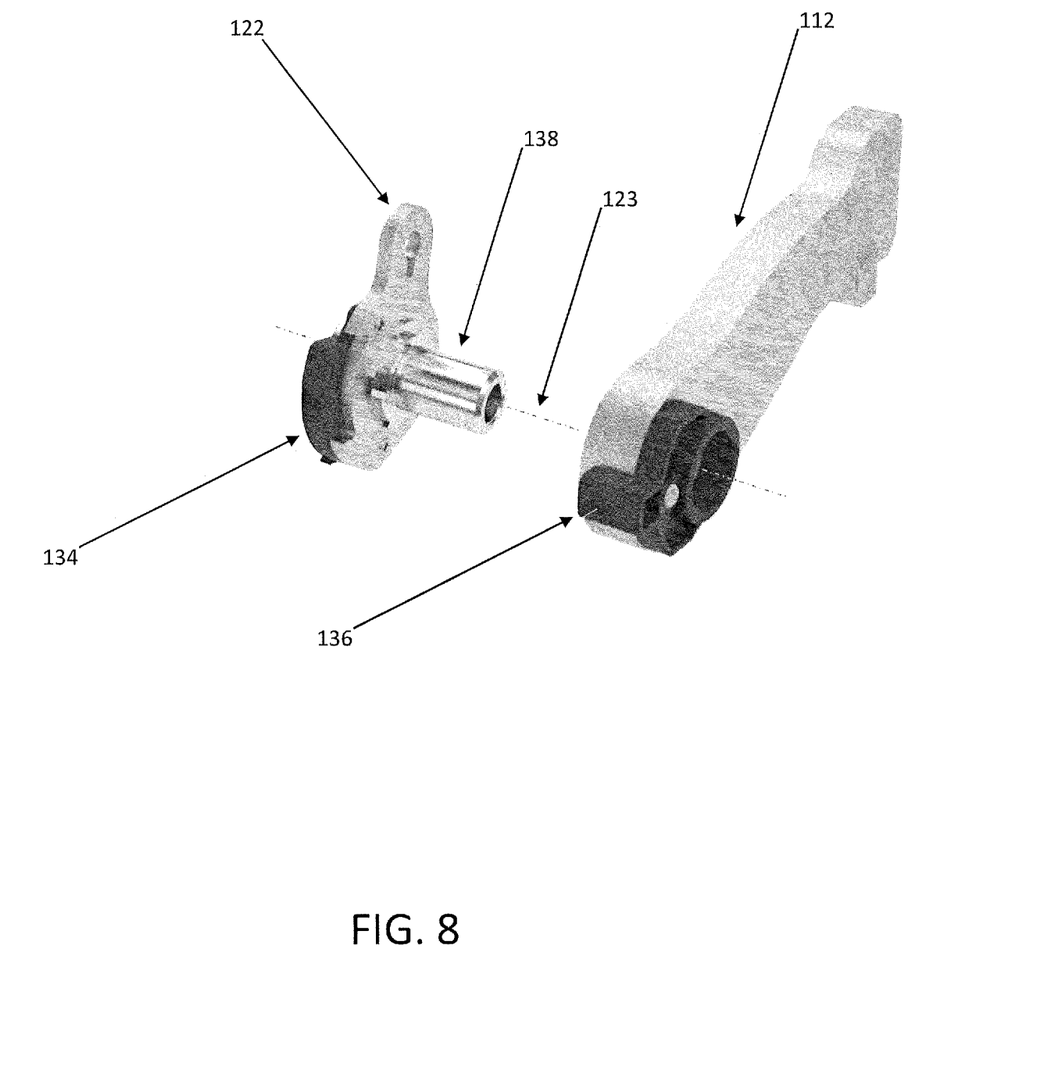
FIG. 8 is a perspective view of one exemplary embodiment of the park pawl engagement and sensor assembly of the present invention, highlighting a portion of the rotational park pawl linkage utilized.

FIG. 8 illustrates the placement of the magnet circuit 134 coupled to the control arm 122 and the magnet circuit 136 coupled to the park pawl 112, in proximity to the sensor housing 128 (FIGS. 6 and 7) and associated sensors 130 and 132 (FIG. 7). Optionally, control arm 122, associated magnet circuit 134, park pawl 112, and associated magnet circuit 136 are all disposed about the same axis 123, such that the annular magnet circuit 134 rotates with the control arm 122 and the annular magnet circuit 136 rotates with the park pawl 112. For example, the control arm 122 and magnet circuit 134 may include a protruding bore 138 about which the park pawl 112 and annular magnet circuit 136 are disposed and rotate, providing relative rotation of the control arm 122 and the park pawl 112. It will be readily apparent to those of ordinary skill in the art that a linear/translation embodiment may also be utilized for the various components and sensors, although this rotational embodiment provides superior footprint efficiency.

Figure 9:
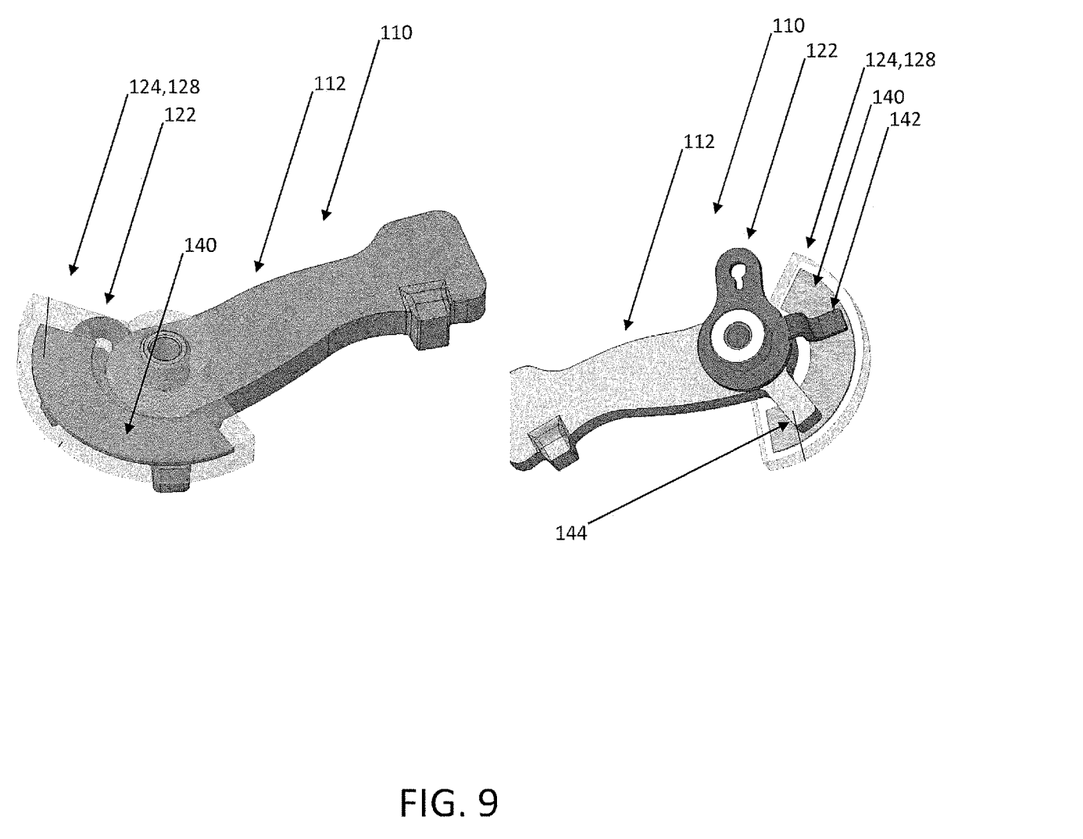
FIG. 9 is a series of perspective views of another exemplary embodiment of the park pawl engagement and sensor assembly of the present invention.

FIG. 9 is a series of perspective views of another exemplary embodiment of the park pawl assembly 110 of the present invention. In this alternative embodiment, the sensor package 124 includes a common housing 128 coupled to the park pawl 112 and actuator 122 that houses a common circuit board 140 on which an actuator sensor region and a park pawl sensor region are disposed. Optionally, these regions form inductive eddy current sensors or the like. Accordingly, the actuator 122 includes a protruding portion 142 that is disposed and translates adjacent to the actuator sensor region of the circuit board 140. Similarly, the park pawl 112 includes a protruding portion 144 that is disposed and translates adjacent to the park pawl sensor region of the circuit board 140. Thus, two sensor components are more efficiently combined into a single mechanism.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A park pawl engagement and sensor assembly for use in a vehicle with an automatic transmission, comprising:
   an elongate park pawl member comprising a raised tooth structure disposed at a proximal end thereof and pivotable about a pivot point disposed at a distal end thereof, wherein the raised tooth structure is configured to selectively engage a corresponding recessed structure of an output gear, thereby selectively preventing rotation of the output gear and preventing movement of the vehicle;
   a linkage physically contacting the proximal end of the park pawl member and configured to selectively bias the raised tooth structure of the park pawl member into the recessed structure of the output gear;
   a control arm physically coupled to the linkage and configured to selectively actuate the linkage, wherein the control arm is pivoted to selectively actuate the linkage;
   a first sensor coupled to one or more of the linkage and the control arm and configured to sense actuation of the one or more of the linkage and the control arm; and
   a second sensor coupled to the park pawl member and configured to sense actuation of the park pawl member.

2. The park pawl assembly of claim 1, wherein the linkage is translated into the park pawl member to selectively bias the raised tooth structure of the park pawl member into the recessed structure of the output gear.

3. The park pawl assembly of claim 1, wherein a proximal end of the linkage contacting the park pawl member comprises a spring member configured to provide a resistive force between the park pawl member and the linkage.

4. The park pawl assembly of claim 1, wherein the park pawl member and the control arm are pivoted about a common axis.

5. The park pawl assembly of claim 1, wherein the first sensor is magnetically or electromagnetically coupled to one or more of the linkage and the control arm via a first magnet or metallic portion associated with the one or more of the linkage and the control arm.

6. The park pawl assembly of claim 1, wherein the second sensor is magnetically or electromagnetically coupled to the park pawl member via a second magnet or metallic portion associated with the park pawl member.

7. The park pawl assembly of claim 1, wherein the first sensor and the second sensor are disposed in a common housing.

8. The park pawl assembly of claim 1, further comprising a third sensor coupled to the output gear and configured to sense rotation of the output gear.

9. The park pawl assembly of claim 1, wherein one or more of the first sensor and the second sensor are inductive eddy current sensors.

10. A park pawl engagement and sensor method for use in a vehicle with an automatic transmission, comprising:
    providing an elongate park pawl member comprising a raised tooth structure disposed at a proximal end thereof and pivotable about a pivot point disposed at a distal end thereof, wherein the raised tooth structure is configured to selectively engage a corresponding recessed structure of an output gear, thereby selectively preventing rotation of the output gear and preventing movement of the vehicle;
    providing a linkage physically contacting the proximal end of the park pawl member and configured to selectively bias the raised tooth structure of the park pawl member into the recessed structure of the output gear;
    providing a control arm physically coupled to the linkage and configured to selectively actuate the linkage;
    pivoting the control arm is to selectively actuate the linkage;
    providing a first sensor coupled to one or more of the linkage and the control arm and configured to sense actuation of the one or more of the linkage and the control arm; and
    providing a second sensor coupled to the park pawl member and configured to sense actuation of the park pawl member.

11. The park pawl method of claim 10, further comprising translating the linkage is translated into the park pawl member to selectively bias the raised tooth structure of the park pawl member into the recessed structure of the output gear.

12. The park pawl method of claim 10, further comprising providing a spring member configured to provide a resistive force between the park pawl member and the linkage at a proximal end of the linkage contacting the park pawl member.

13. The park pawl method of claim 10, further comprising pivoting the park pawl member and the control arm about a common axis.

14. The park pawl method of claim 10, further comprising magnetically or electromagnetically coupling the first sensor to one or more of the linkage and the control arm via a first magnet or metallic portion associated with the one or more of the linkage and the control arm.

15. The park pawl method of claim 10, further comprising magnetically or electromagnetically coupling the second sensor to the park pawl member via a second magnet or metallic portion associated with the park pawl member.

16. The park pawl method of claim 10, further comprising disposing the first sensor and the second sensor in a common housing.

17. The park pawl method of claim 10, further comprising providing a third sensor coupled to the output gear and configured to sense rotation of the output gear.

18. The park pawl method of claim 10, further comprising providing one or more of the first sensor and the second sensor as inductive eddy current sensors.

19. A park pawl engagement and sensor assembly for use in a vehicle with an automatic transmission, comprising:
    a park pawl member comprising a raised tooth structure disposed at an end thereof, wherein the raised tooth structure is configured to selectively engage a corresponding recessed structure of an output gear, thereby selectively preventing rotation of the output gear and preventing movement of the vehicle;
    an actuator coupled to the park pawl member and configured to selectively bias the raised tooth structure of the park pawl member into the recessed structure of the output gear wherein the actuator comprises a control arm pivotably coupled to a linkage that physically contacts and translates the park pawl member;
    a first sensor component coupled to the actuator and configured to sense actuation of the actuator; and a second sensor component coupled to the park pawl member and configured to sense actuation of the park pawl member.

20. The park pawl assembly of claim 19, further comprising a third sensor component coupled to the output gear and configured to sense rotation of the output gear.

\* \* \* \* \*